(12) United States Patent
Beckner et al.

(10) Patent No.: US 8,613,682 B2
(45) Date of Patent: Dec. 24, 2013

(54) ROTATING CLUTCH BALANCE FILL SYSTEM

(75) Inventors: Kevin C. Beckner, Indianapolis, IN (US); Michael D. Foster, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/464,536

(22) Filed: May 4, 2012

(65) Prior Publication Data

US 2013/0296092 A1 Nov. 7, 2013

(51) Int. Cl.
*F16H 31/00* (2006.01)

(52) U.S. Cl.
USPC .......................................................... 475/146

(58) Field of Classification Search
USPC .......................................................... 475/146
See application file for complete search history.

(56) References Cited

U.S. PATENT DOCUMENTS

| | | | | |
|---|---|---|---|---|
| 4,458,797 A | * | 7/1984 | Hawkins | 192/52.4 |
| 4,732,253 A | * | 3/1988 | Hiramatsu et al. | 192/48.618 |
| 4,741,422 A | * | 5/1988 | Fuehrer et al. | 192/48.617 |
| 5,172,799 A | * | 12/1992 | Iijima et al. | 192/106 F |
| 5,887,690 A | * | 3/1999 | Haupt | 192/48.611 |
| 6,021,879 A | * | 2/2000 | Pelouch | 192/106 F |
| 6,595,340 B2 | * | 7/2003 | Moorman et al. | 192/85.25 |
| 6,705,447 B2 | * | 3/2004 | Gorman et al. | 192/85.25 |
| 7,001,298 B2 | * | 2/2006 | Biermann et al. | 475/116 |
| 7,040,474 B2 | * | 5/2006 | Pedersen et al. | 192/85.25 |
| 7,293,637 B2 | * | 11/2007 | Janson et al. | 192/48.611 |
| 7,416,069 B2 | * | 8/2008 | Tiesler | 192/48.611 |
| 7,648,012 B2 | * | 1/2010 | Gremplini et al. | 192/48.611 |
| 7,731,624 B2 | * | 6/2010 | Nishida et al. | 475/275 |
| 7,802,667 B2 | * | 9/2010 | Raszkowski et al. | 192/106 F |
| 7,862,461 B2 | * | 1/2011 | Nishida et al. | 475/146 |
| 7,931,135 B2 | * | 4/2011 | Dougan et al. | 192/85.25 |
| 7,954,615 B2 | * | 6/2011 | Tiesler et al. | 192/48.619 |
| 8,167,756 B2 | * | 5/2012 | Nishida et al. | 475/159 |
| 8,348,797 B2 | * | 1/2013 | Foster et al. | 475/116 |
| 2003/0075413 A1 | * | 4/2003 | Alfredsson | 192/87.15 |
| 2005/0067251 A1 | * | 3/2005 | Braford et al. | 192/70.12 |

* cited by examiner

*Primary Examiner* — Dirk Wright

(57) ABSTRACT

A rotating clutch operably disposed between two rotating components includes a hydraulic operator having a piston and, on one side of the piston, an apply chamber or cavity and, on the opposite side of the piston, a balance chamber or cavity. The apply chamber is selectively provided with pressurized hydraulic fluid to engage and release the clutch to couple and de-couple the two rotating components. The balance chamber is provided with a flow of pressurized hydraulic fluid from the transmission lubrication system that flows through the transmission main shaft and flow restricting passages to the balance chamber. An exhaust port downstream of the balance chamber releases excess hydraulic fluid flow. Thus, whether, the clutch is rotating or not, hydraulic pressure is maintained in the balance chamber and proper clutch operation is assured.

10 Claims, 2 Drawing Sheets

ROTATING CLUTCH BALANCE FILL SYSTEM

FIELD

Figure 1:
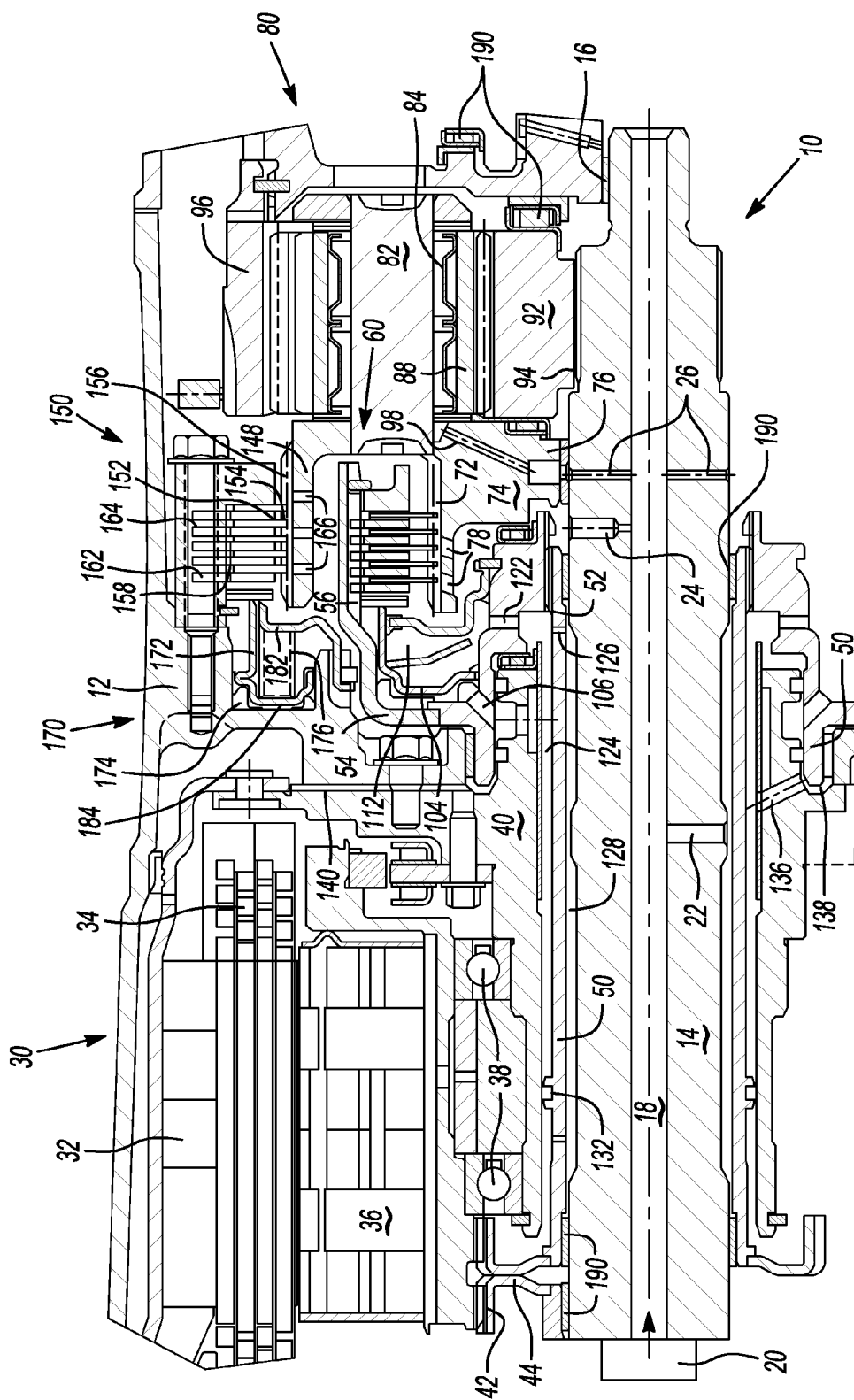

The present disclosure relates to clutches utilized in automatic transmissions and more particularly to hydraulically operated rotating clutches utilized in automatic motor vehicle transmissions.

BACKGROUND

The statements in this section merely provide background information related to the present disclosure and may or may not constitute prior art.

Rotating clutches, that is, devices having both rotating clutch elements and clutch operators, are often utilized within automatic motor vehicle transmissions and similar devices to transmit torque between two rotating components. Upon a suitable command, these clutches engage and disengage by stroking a hydraulically driven piston. When rotating, the oil behind the hydraulic piston in an apply cavity builds pressure due to centrifugal effects. The force thus generated must be countered by an equivalent opposing force in order to prevent unintended piston stroke and clutch engagement. This opposing force is commonly provided by a second volume of oil contained in a balance cavity on the opposite side of the piston. As the rotating clutch spins, centrifugally generated oil pressure and thus force within the apply cavity and the balance cavity cancel each other out.

In prior art transmission configurations, oil utilized within the balance cavity is non-pressurized lubrication oil collected and fed into the balance cavity through centrifugal effects only during rotation. In situations where the rotating clutch is brought to rest, the balance cavity will drain. The apply cavity, however, will remain fluid filled even when the clutch is released. This is done for shift quality considerations. If the clutch with a drained balance cavity is rapidly accelerated, a condition may develop in which the clutch piston is no longer force balanced. These situations are particularly common in hybrid transmissions in which rotating clutches are utilized with electric motors capable of extremely rapid rates of acceleration.

SUMMARY

The present invention provides a rotating clutch having an improved balance cavity (chamber) fill system. The rotating clutch includes a friction clutch pack that selectively connects two rotating transmission components and transmits torque therebetween. The clutch includes a hydraulic operator having a piston and, on one side or face of the piston, an apply chamber or cavity and, on the opposite side or face of the piston, a balance chamber or cavity. The apply chamber is selectively provided with pressurized hydraulic fluid to engage and release the clutch pack to couple and de-couple the two rotating transmission components. The balance chamber is provided with a flow of pressurized hydraulic fluid from the transmission lubrication system that flows through the transmission main shaft and flow restricting ports and passageways to the balance chamber. An exhaust port downstream of the balance chamber releases hydraulic fluid flow to the atmosphere (within the transmission) to prevent pressure buildup within the balance chamber that might inhibit proper clutch engagement. Thus, a proper fill of the balance chamber is maintained whether the clutch and operator are rotating or not, thereby assuring satisfactory, controlled and balanced operation of the rotating clutch, especially during periods of rapid acceleration.

Thus it is an aspect of the present invention to provide a hydraulic arrangement that improves the operation of rotating clutches in automatic transmissions.

It is a further aspect of the present invention to provide a rotating clutch having an operator with an apply chamber and a balance chamber with a hydraulic fluid supply that improves operation during periods of rapid acceleration after a stop.

It is a still further aspect of the present invention to provide a rotating clutch having an operator including an apply chamber and a balance chamber with a supply of lubrication oil that maintains fluid presence within the balance chamber when the clutch and operator are not rotating.

It is a still further aspect of the present invention to provide a rotating clutch having an operator including an apply chamber and a balance chamber which is supplied with hydraulic fluid from a lubrication passageway in the main shaft.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
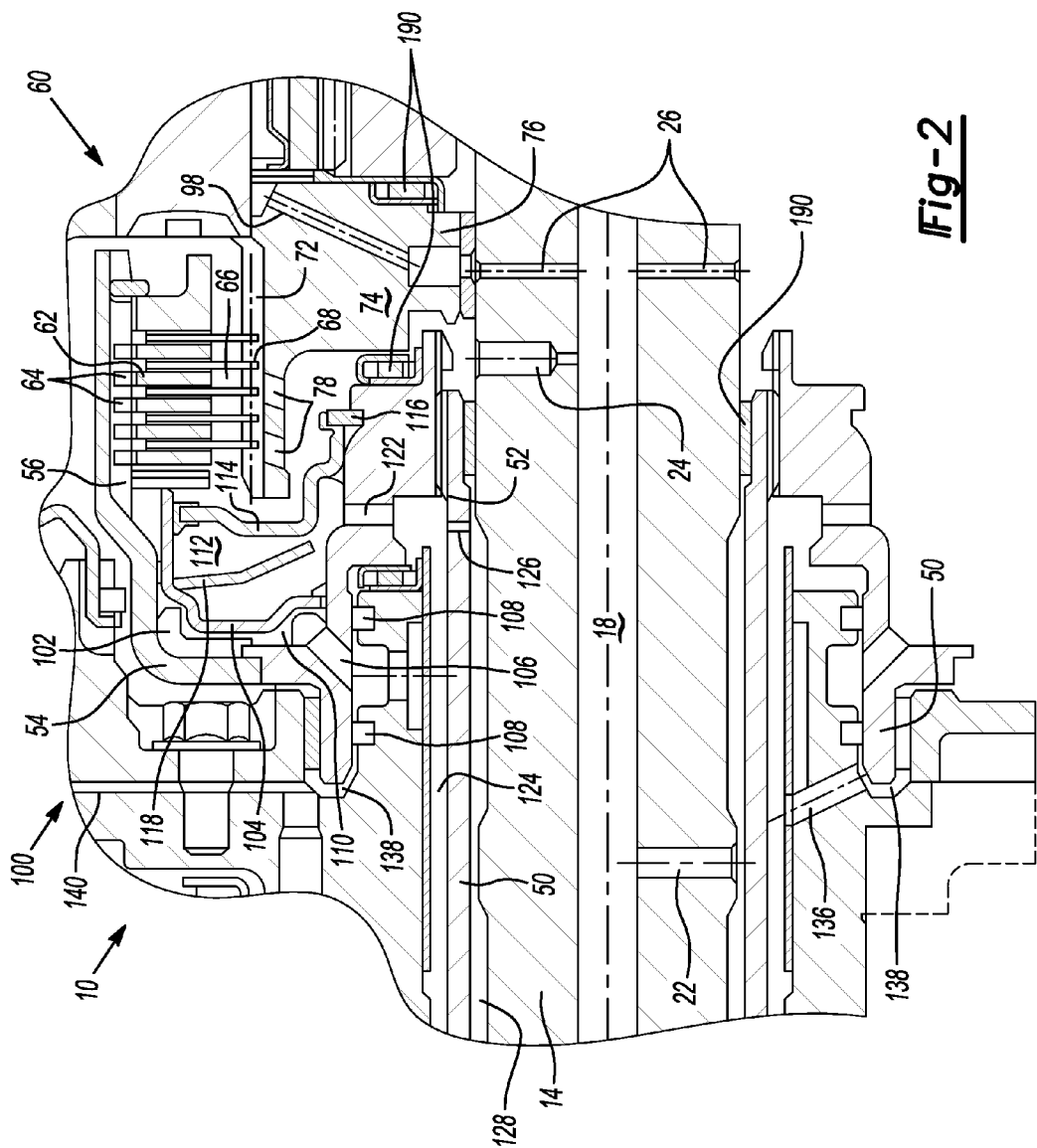

FIG. 1 is a sectional view of a portion of an automatic transmission incorporating the present invention; and FIG. 2 is an enlarged, fragmentary sectional view of a portion of an automatic transmission incorporating the present invention.

DETAILED DESCRIPTION

The following description is merely exemplary in nature and is not intended to limit the present disclosure, application, or uses.

With reference to FIGS. 1 and 2, a portion of an automatic transmission for a motor vehicle is illustrated and generally designated by the reference number 10. The automatic transmission 10 includes a typically cast metal housing 12 which locates, supports and protects the various components of the automatic transmission 10. Among these components is a main shaft 14 which is supported for rotation by a plurality of anti-friction bearings 16, one of which is illustrated in FIG. 1. The main shaft 14 defines a central, axial fluid passageway 18 which carries pressurized hydraulic fluid (transmission oil) from a hydraulic pump 20, to a plurality of radial ports or passageways 22, 24 and 26. The pressurized hydraulic fluid is utilized to maintain fluid presence in the balance chamber and lubricate the various rotating components, bearings and interfaces within the automatic transmission 10 as will be more fully described subsequently.

Disposed within the housing 12 of the automatic transmission 10 is an electric motor 30 having a stator 32 with electrical windings 34 and a rotor 36 which is supported on a pair of anti-friction bearing such as ball bearing assemblies 38. The ball bearing assemblies 38 are, in turn, supported by a stationary bulkhead 40 which is secured to or integrally formed with the transmission housing 12. The rotor 36 is coupled through an interengaging spline set 42 to a flange 44 that extends radially from a tubular drive member or quill 50. The tubular drive member or quill 50 extends axially and concentrically along and about the main shaft 14 and terminates at another interengaging spline set 52 which couples the tubular drive member or quill 50 to a drive hub 54 having female splines 56 which function as the drive member of a first friction clutch assembly 60.

As is particularly well illustrated in FIG. 2, the first friction clutch assembly 60 includes a first plurality of larger diameter clutch plates or discs 62 having males splines 64 complementary to and engaged by the female splines 56 on the drive hub 54. The first plurality of clutch plates or discs 62 are interleaved with a second plurality of smaller diameter clutch plates or discs 66 having female splines 68 which are complementary to and engage male splines 72 on an inner hub 74 of a planet gear carrier 76 which is a component of a compound planetary gear assembly 80.

It should be understood that although the planetary gear assembly herein described and illustrated is a compound assembly having a plurality of gear trains comprising two planet gears in a planet gear carrier, the present invention may alternatively be utilized with a simple planetary gear assembly, that is, a planetary gear assembly having a plurality of planet gears disposed between and each meshing with both a sun gear and a ring gear. As a further alternative, the planet gear carrier 76 may be replaced by any torque carrying member such as a shaft, quill or similar component. The inner hub 74 of the planetary gear carrier 76 includes a first plurality of oblique lubrication passageways 78 which generally align with and receive lubricating and cooling fluid from the radial port 24. in the main shaft 14 and provide and direct it to the plates or discs 62 and 66 of the first friction clutch assembly 60.

In addition to the planetary gear carrier 76, the compound planetary gear assembly 80 includes a plurality of pairs of stub shafts 82, one of which is illustrated in FIG. 1, which support on needle or roller bearings 84 a like plurality of pairs of planet gears 88, one of which is illustrated in FIG. 1. The planetary gear assembly 80 also includes a sun gear 92 which is coupled to the main shaft 14 by an interengaging spline set 94 and is in constant mesh with one of each of the pairs of planet gears 88 and a ring gear 96 that is in constant mesh with the other of each of the pairs of planet gears 88. A plurality of oblique passageways 98, one of which is illustrated in FIG. 1, provide and direct a flow of pressurized hydraulic (lubricating and cooling) fluid from the radial ports 26 in the main shaft 14 to the stub shafts 82 and the bearings 84 of the planetary gear assembly 80.

The first friction clutch assembly 60 also includes a balanced hydraulic operator 100 having an apply cylinder, chamber or cavity 102 which is formed or defined by the drive hub 54. Axially slidably disposed within the apply cylinder or cavity 102 is a piston 104 which engages and compresses and releases the first and second pluralities of clutch plates or discs 62 and 66. Controlled, pressurized hydraulic fluid is provided to the apply chamber 102 of the balanced hydraulic operator 100 through an oblique passageway 106 which is isolated by suitable rotating seal rings 108. A plurality of radial stops or bumpers 110 on the back wall of the apply chamber or cavity 102 prevent the piston 104 from fully seating or bottoming against it.

On the side or face of the piston 104 opposite the apply chamber or cavity 102 is a balance chamber or cavity 112. A circular plate or dam 114 which is retained in position by a snap ring or stop 116 includes suitable fluid tight seals and closes off the balance chamber or cavity 112 and allows axial translation of the piston 104. Disposed within the balance chamber or cavity 112 is a Belleville spring or wave washer 118 that provides a biasing or restoring force to translate the piston 104 to the left in FIGS. 1 and 2 and urges disengagement of the friction clutch assembly 60.

One or more radial passageways 122 extend through the drive hub 54 between the balance chamber or cavity 112 and an outer elongate tubular passageway 124 and provide fluid communication therebetween. The outer elongate tubular passageway 124 is, in turn, in fluid communication, through one or more radial passageways 126 in the tubular drive member or quill 50 with an inner elongate tubular passageway 128 which, in turn, receives hydraulic fluid flow exiting the first radial passageway 22 in the main shaft 14. Thus, hydraulic fluid flow from the central, axial fluid passageway 18 in the main shaft 14 is constantly provided through the passageways 122 to the balance chamber or cavity 112 of the balanced hydraulic operator 100. Of course, as the piston 104 translates to the right in FIGS. 1 and 2, hydraulic fluid will flow out of the balance chamber or cavity 112 and through the passageways 122. A rotating seal ring 132 retained on the outer surface of the tubular drive member or quill 50 seals against the bulkhead 40 and maintains hydraulic fluid in the outer elongate tubular passageway 124 to assist the above-described flow.

The transmission bulkhead 40 includes an oblique passageway 136 disposed under the main shaft 14 and extending between the outer elongate tubular passageway 124 and a concentric circular passageway 138 adjacent the terminus of the drive hub 50. Disposed 180° opposite, that is, at a 12 o'clock or vertical position when the oblique passageway 136 is disposed (preferably) at a 6 o'clock or downward position, is an exhaust or vent port 140. The exhaust or vent port 140 may be formed partially or entirely in one or partially in both of the components of the bulkhead 40. The exhaust or vent port 140 allows any excess volume of hydraulic fluid provided to the balance chamber or cavity 112 to be vented to atmospheric pressure within the transmission 10 and returned to its sump (not illustrated). This prevents static pressure build-up in the balance chamber or cavity 112 but does not affect the centrifugal pressure build-up which counteracts the forces in the apply cavity or chamber 102.

Referring now to FIG. 1, the planet gear carrier 76 also includes an outer hub 148 associated with a second friction clutch (brake) assembly 150. The second friction clutch (brake) assembly 150 includes a first plurality of smaller diameter clutch plates or discs 152 having female splines 154 which are complementary to and engage male splines 156 on the outer hub 148. The first plurality of smaller clutch plates or discs 152 are interleaved with a second plurality of larger diameter clutch plates or discs 158 having male splines 162 which are complementary to and engage stationary female splines 164 which are integrally formed with or coupled to the housing 12. The outer hub 148 also includes a second plurality of radial lubrication passageways 166 which provide and direct lubricating and cooling oil flow to the plates or discs 152 and 158 of the second friction clutch (brake) assembly 150.

The second friction clutch (brake) assembly 150 also includes a conventional (unbalanced) hydraulic operator 170. Since the hydraulic operator 170 of the second friction clutch (brake) assembly 150 does not rotate, there is no need to provide a balanced operator. The conventional hydraulic operator 170 includes an annular piston 172 that is axially slidably received within an annular cylinder or chamber 174. A biasing or return spring 176 which, because it does not rotate, may be one or more coil compression springs, is disposed between the piston 172 and a circular stop plate 182. Again, if desired, a plurality of radial stops or bumpers 184 may be disposed on the back wall of the cylinder or chamber 174 to prevent the annular piston 172 from fully seating against it.

Last of all, it should be understood that various ball, roller and needle, shaft and thrust bearings 190 may be utilized as needed within the transmission 10 to separate components and reduce friction.

The balanced hydraulic operator 100 of the first friction clutch assembly 60 provides improved operation of an automatic transmission, especially when it is paired with an electric motor in a hybrid powertrain. When stationary, the balance chambers or cavities of prior art balanced clutches will partially drain. If the transmission components accelerate relatively slowly, as they typically do with an internal combustion engine power source, fluid and pressure will generally be restored to the balance chamber such that nominal clutch operation will occur.

In a hybrid powertrain, acceleration may be so rapid that a partially drained balance chamber will not refill quickly enough and interfere with desired and/or predicted clutch operation. The constant supply of transmission fluid through the radial ports 22 of the main shaft 14, through the radial passageways 122 and 126 (and the flow restrictions these and other components represent) to the balance chamber or cavity 112 and the constant venting of overpressure of excess hydraulic fluid through the exhaust or vent port 140 ensure that the balance chamber or cavity 112 of the balanced hydraulic operator 100 of the present invention will be filled and achieve proper, balanced operation of the friction clutch assembly 60 under a wide range of operating and acceleration conditions.

The description of the invention is merely exemplary in nature and variations that do not depart from the gist of the invention are intended to be within the scope of the invention. Such variations are not to be regarded as a departure from the spirit and scope of the invention.

What is claimed is:

1. A rotating clutch assembly for a motor vehicle transmission having a balance cavity fill system comprising, in combination,
    a supply of pressurized hydraulic fluid,
    a transmission main shaft having an axial fluid passageway in fluid communication with said supply of pressurized hydraulic fluid,
    a quill disposed about a portion of said transmission shaft,
    an electric motor having a rotor disposed concentrically about and coupled to said quill,
    a clutch assembly having an input member coupled to said quill, a first plurality of clutch plates operably coupled to said input member, an output member, a second plurality of clutch plates operably coupled to said output member and interleaved with said first plurality of clutch plates and a hydraulic operator,
    said hydraulic operator including a piston having an apply face and a balance face disposed in operable relationship with said pluralities of clutch plates, an apply cavity adjacent said apply face of said piston, said apply cavity in fluid communication with a controlled supply of pressurized hydraulic fluid, a balance cavity adjacent said balance face of said piston, said balance cavity in fluid communication with said supply of pressurized hydraulic fluid and a return spring disposed in said balance cavity, and
    a planetary gear assembly having a sun gear, a plurality of planet gears disposed in a planet gear carrier and a ring gear, said planet gear carrier operably coupled to said output member of said clutch assembly.

2. The rotating clutch assembly of claim 1 wherein said transmission main shaft includes at least one radial passageway for providing fluid to said balance cavity.

3. The rotating clutch assembly of claim 1 further including an exhaust passageway in fluid communication with said balance cavity and having a stationary exhaust port opening above said balance cavity for maintaining fluid in said balance cavity and preventing pressure buildup in said balance cavity.

4. A fluid balanced rotating clutch assembly for a motor vehicle transmission comprising, in combination,
    a transmission main shaft having an axial fluid passageway,
    a tubular drive member concentrically disposed about said transmission main shaft,
    an electric motor having a rotor disposed concentrically about said transmission main shaft and coupled to said tubular drive member,
    a source of pressurized hydraulic fluid in fluid communication with said axial fluid passageway,
    a clutch assembly disposed about said transmission shaft and having an input member operably coupled to said tubular drive member, a first plurality of clutch plates operably coupled to said input member, an output member, a second plurality of clutch plates operably coupled to said output member and interleaved with said first plurality of clutch plates and a hydraulic operator,
    said hydraulic operator including a piston disposed in operable relationship with said pluralities of clutch plates and having an apply face and a balance face, an apply chamber adjacent said apply face of said piston, said apply chamber in fluid communication with a controlled supply of pressurized hydraulic fluid and a balance chamber adjacent said balance face of said piston, said balance chamber in fluid communication with said axial fluid passageway in said transmission shaft, and
    a planetary gear assembly having a sun gear, a plurality of planet gears disposed in a planet gear carrier and a ring gear, said sun gear operably coupled to said transmission shaft.

5. The fluid balanced rotating clutch assembly of claim 4 wherein said planet gear carrier is operably coupled to said output member of said clutch assembly.

6. The fluid balanced rotating clutch assembly of claim 4 further including a second clutch assembly having a first plurality of clutch plates operably coupled to said planet gear carrier and a second, interleaved plurality of clutch plates operably coupled to ground.

7. The fluid balanced rotating clutch assembly of claim 4 further including an exhaust passageway in fluid communication with said balance chamber and having a stationary exhaust opening disposed above said balance chamber for maintaining hydraulic fluid in said balance chamber.

8. A balanced rotating clutch assembly for a motor vehicle transmission comprising, in combination,
    a transmission main shaft having an axial fluid passageway,
    a source of pressurized hydraulic fluid in fluid communication with said axial fluid passageway,
    a tubular drive member disposed about said transmission main shaft,
    a plurality of ports in said transmission main shaft and said tubular drive member,
    an electric motor having a rotor disposed about said transmission main shaft and coupled to said tubular drive member,
    a clutch assembly disposed about said transmission main shaft and having an input member coupled to said tubular drive member, a first plurality of clutch plates operably coupled to said input member, an output member, a second plurality of clutch plates operably coupled to said output member and interleaved with said first plurality of clutch plates and a hydraulic operator, said hydraulic operator including a piston disposed in operable relationship with said pluralities of clutch plates and having an apply side and a balance side, an apply chamber adjacent said apply side of said piston, said apply chamber in fluid communication with a controlled supply of pressurized hydraulic fluid, a balance chamber adjacent said balance side of said piston, said balance chamber in fluid communication with said axial fluid passageway in said transmission main shaft through said plurality of ports, a spring disposed in said balance chamber and an exhaust passageway in fluid communication with said balance chamber, and a planetary gear assembly having a sun gear, a plurality of planet gears disposed in a planet gear carrier and a ring gear, said planet gear carrier operably coupled to said output member of said clutch assembly and said sun gear operably coupled to said transmission main shaft.

9. The balanced rotating clutch assembly of claim 8 further including a second clutch having interleaved pluralities of clutch plates disposed between said planet gear carrier and a housing.

10. The fluid balanced rotating clutch assembly of claim 8 wherein said exhaust passageway includes a stationary exhaust port disposed above said balance chamber to maintain hydraulic fluid in said balance chamber.

* * * * *